May 28, 1957 E. W. CROW 2,794,112
AUTOMATIC ARC WELDER
Filed Feb. 21, 1955 2 Sheets-Sheet 1

INVENTOR:
Edgar W. Crow
By Hubert E. Metcalf
His Patent Attorneys

May 28, 1957 E. W. CROW 2,794,112
AUTOMATIC ARC WELDER
Filed Feb. 21, 1955 2 Sheets-Sheet 2
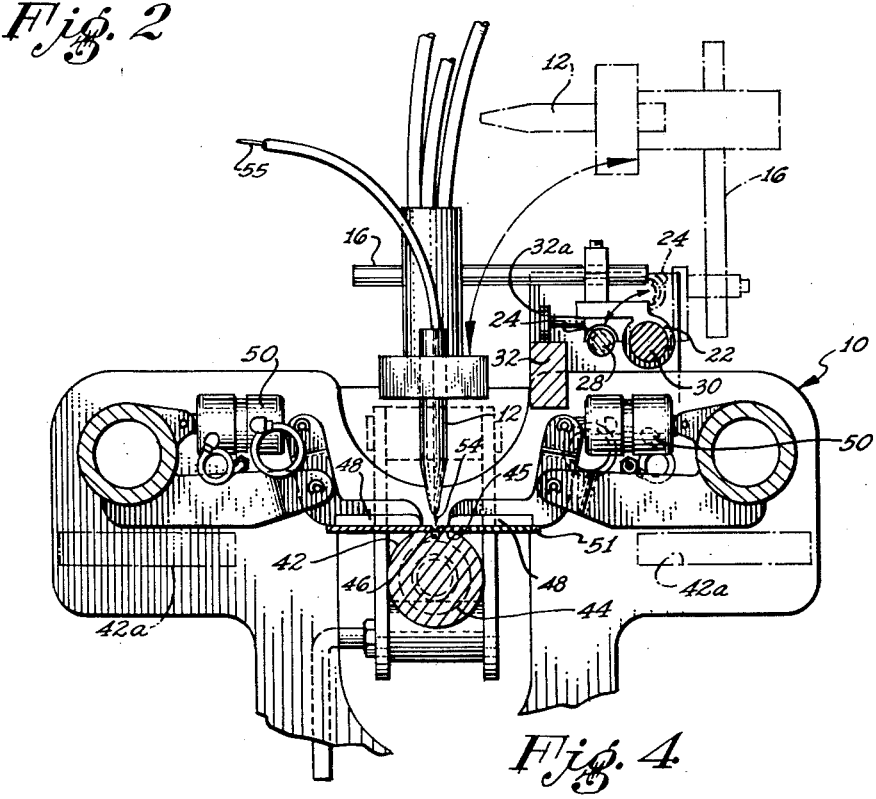
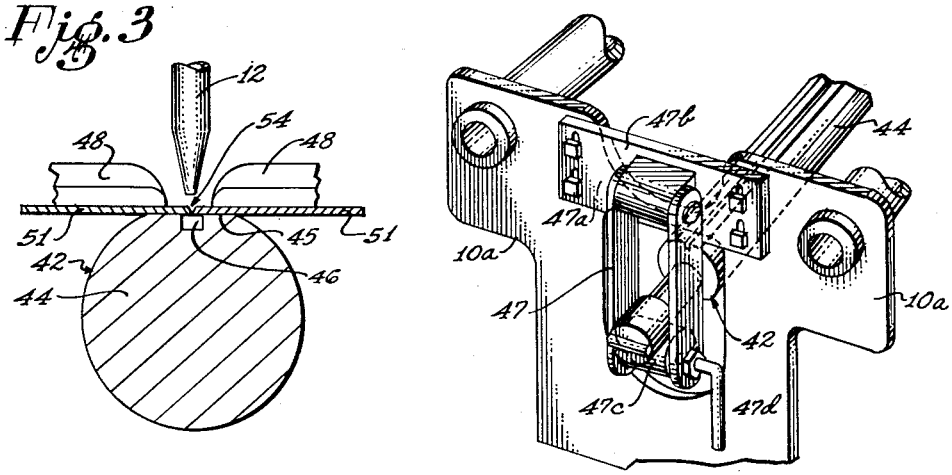
INVENTOR:
Edgar W. Crow
By Hubert E. Metcalf
His Patent Attorney

United States Patent Office 2,794,112
Patented May 28, 1957

2,794,112

AUTOMATIC ARC WELDER

Edgar W. Crow, Manhattan Beach, Calif., assignor to Northrop Aircraft, Inc., Hawthorne, Calif., a corporation of California Application February 21, 1955, Serial No. 489,589

2 Claims. (Cl. 219—125)

This invention relates to welding apparatus, and more particularly to a device for automatic welding.

Present automatic welding equipment usually is in the form of mobile traveling units, wheel-mounted and having built-in electric motors. The track on which the welder moves must be placed in position on one of the parts to be welded, and this process must be repeated for each part being welded. Clamping of workpieces may be an awkward process, and the wobbling of the self-propelled welding device on the track tends to make an irregular rough seam weld.

In the automatic welder of the present invention, a welding head is positioned to travel over the workpiece which is clamped in the machine to butt-weld, for instance, and held in place by hydraulic or pneumatic operated clamps, thus evenly applying the weld as the head moves automatically along the seam by lead screw traversing means.

Gas blanketed electric arc welding is known to the art wherein the process consists of feeding a bare filler wire in conjunction with an inert shielding gas through an arc welding head in which the welding wire picks up welding current supplied by a standard source of welding power. When the wire is fed from the welding head to the work it becomes a consumable electrode. The shielding gas, fed through the welding head simultaneously with the wire, forms an envelope of protective gas around the welding area. This protects the weld metal, the electrode wire and the work eliminating the use of flux and the formation of slag.

In broad terms, the present invention in one form comprises a stationary work support with clamps to hold flat sheets, or a sheet bent into the form of a tube to be seam welded, and a welding head with welding wire feed means, if needed, positioned so the welding heat is applied as it is moved along the line of the seam to be welded by a lead screw driven by its own separate motor.

It is an object of the present invention to provide an automatic welder with a stationary workpiece support which is arranged so that either flat or curved sheet may be welded.

Another object of the invention is to provide an automatic welder with simultaneously operated clamps to hold the workpiece firmly in place.

Yet another object of the invention is to provide an automatic welder with lead screw means to lineally move the welding head along the line of seam to be welded.

Still another object of the invention is to provide an automatic welder that will produce a uniform and even seam weld.

Other more specific objects of the invention will appear from the disclosure of the following detailed description of a preferred embodiment thereof, having reference to the accompanying drawings which constitute a part of said disclosure.

While this machine is described used in combination with an electric arc welding head it is strictly understood that it is only as an example of one application of the present invention.

In the drawings:

Figure 2 is a cross-section on the line 2—2 in Figure 1.

Figure 3 is a fragmentary cross-section on the line 3—3 in Figure 1.

Figure 4 is a fragmentary perspective view of an adjustable swinging bearing for the workpiece support.

Figure 1:
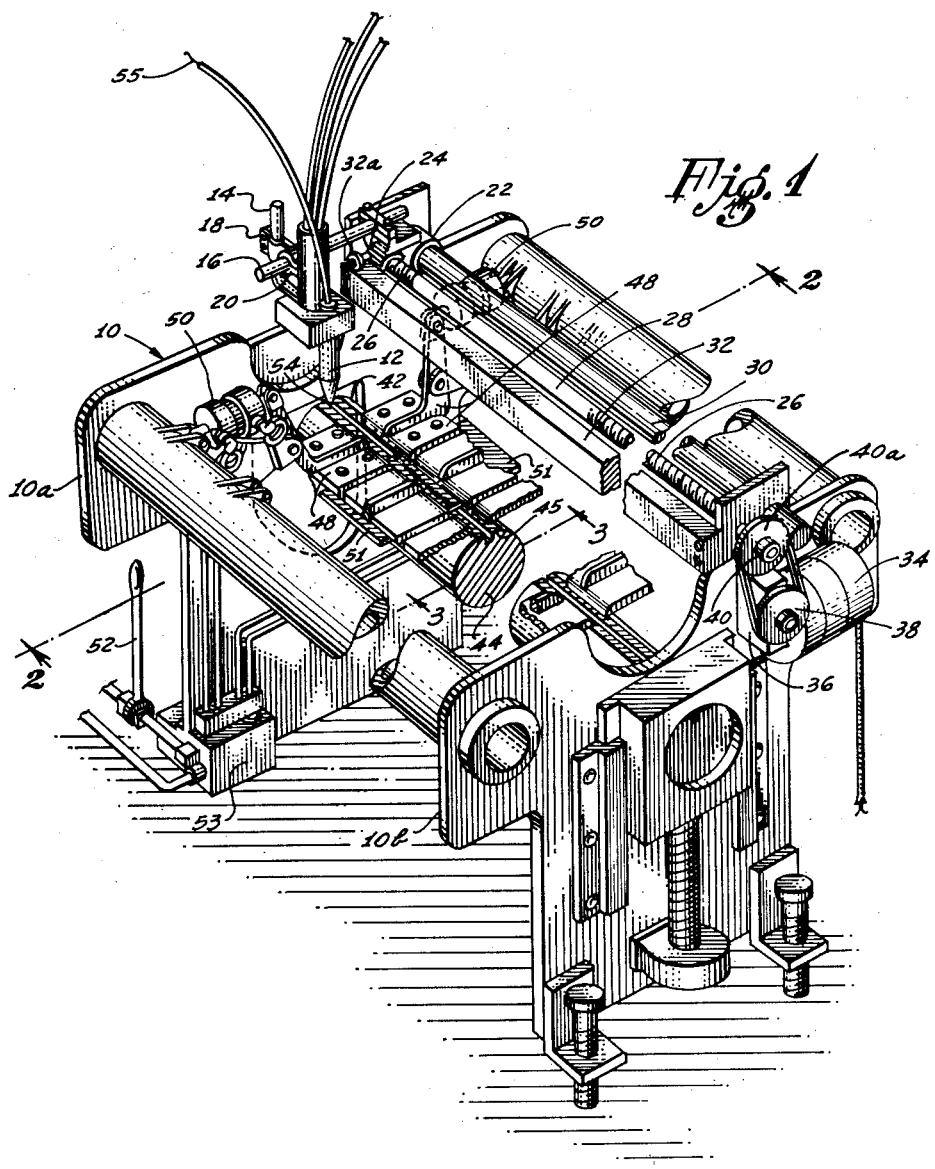
Figure 1 is a perspective view of one form of the machine of this invention.

Referring now to Figure 1 of the drawings, the numeral 10 indicates a frame comprising spaced end plates 10a, 10b. Gas blanketed arc welding head 12 or the like, used in combination with the present invention, is supported by fixtures 14, 16, having adjustment clamps 18, 20, mounted on a collar 22 slidable on a guide rod 30 extending between frame plates 10a and 10b.

Collar 22 is provided with an internally threaded arcuate lateral projection 24, engaging the screw threads 26 of a lead screw 28 rotatably mounted in bearings in the end plates so that when the lead screw 28 is rotated the welding head 12 travels lineally along the guide rod 30. A track bar 32 is also secured between the end plates and a wheel 32a mounted on lateral extension 24 travels with the head along said track bar. The function of wheel 32a is to support part of the weight of the welding head 12.

The lead screw 28 is rotated by a reversible gear box 36, electric motor 34 driving pulley 38 mounted on the output shaft of gear box 36 and pulley 40 on lead screw 26, a drive belt 40a being mounted on pulleys 38 and 40.

The workpiece support 42 consists of a round metal bar 44, which can be adjusted toward or away from the welding head and has a longitudinal milled flat surface 45, and a slot 46 in said surface for weld metal clearance. Support 42 is detachably supported at one end by an adjustable hinged bracket 47 as shown in Figure 4, which may be swung away from the end of support 42 about an axis 47a to enable sheet rolled into a tube not shown, to be pushed endwise onto the support to be seam welded. The hinged bracket is mounted on plate 47b, and adjustably mounted on frame end plate 10a. Preferably a quickly engaged part is mounted in the end of the bracket engaging with the end of the support 42, as shown in the drawing. This member 47c is an eccentrically mounted roller mounted fixedly on a shaft rotatable in bracket 47 by crank 47d.

A plurality of work clamps 48 operated by pneumatic valves 50 securely hold the workpiece 51 in a stationary position for welding and are simultaneously brought into operation against, or relieved from the work, by means of lever 52 controlling valve 53.

Included in combination with the gas blanketed arc welder is a wire drive unit, not shown, for feeding the welding wire 55 from a reel through the welding head 12 to the welding point 54.

Control boxes, rheostats and valves for the control of inert gas flow and water flow, and other associated equipment for a gas blanketed arc welder, being known to the art, are not shown or described.

As one example of the operation of the machine two sheets of 61 SO aluminum sheet, .050 inch thick to be butt-welded, for instance, are supported on tables indicated in dotted lines at 42a and clamped in place on the workpiece support 42, the edges of the sheets being positioned in lineal alignment with the center of the slot 46.

For welding the workpiece 1/16 inch, 52S welding wire should be used and fed at the rate of 16 inches per minute.

The welding head 12 travel speed should be approximately the same speed (16 I. P. M.), and the lead screw 28, which is threaded for 6 turns per inch, should rotate at a rate to attain this travel speed, or that determined by the skill of the operator, the proper speed being secured by setting the gear ratios in the gear box 36.

Argon gas is used in the arc welder, and for this particular welding application is fed through the welding head 12 to the welding point 54 at the flow rate of 4 litres per minute.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. An automatic welder comprising: a frame having a pair of spaced end plates and a pair of spaced parallel tubes spanning the distance between and connecting said end plates; a guide rod connected to said frame that is parallel to said tubes; a welding head having a collar that is slidable and rotatable on said guide rod; a rotatable lead screw on said frame and parallel to said guide rod; an internally threaded, accurate projection on said collar that engages said lead screw; a track bar on said frame that is parallel to said lead screw; a roller on said welding head that rides upon said track bar to support said welding head; an elongated, cylindrical workpiece support on said frame; said workpiece support having a groove therein in linear alignment with the longitudinal axis of said workpiece support; said workpiece support having a flat surface thereon on each side of said groove that receives and upon which the work to be welded rests; a plurality of pneumatic valves supported by said tubes; a clamp connected to each of said valves and operated thereby that bear against and hold said work to be welded on said workpiece support; and rotatable means on said frame and connected to said workpiece support that is adapted to alter the position of the latter.

2. An automatic welder comprising: a frame having a pair of spaced end plates and a pair of spaced parallel tubes spanning the distance between and connecting said end plates; a guide rod connected to said frame that is parallel to said tubes; a welding head having a collar that is slidable and rotatable on said guide rod; a rotatable lead screw on said frame and parallel to said guide rod; an internally threaded, accurate projection on said collar that engages said lead screw; a track bar on said frame that is parallel to said lead screw; a roller on said welding head that rides upon said track bar to support said welding head; an elongated, cylindrical workpiece support on said frame; said workpiece support having a groove therein in linear alignment with the longitudinal axis of said workpiece support; said workpiece support having a flat surface thereon on each side of said groove that receives and upon which the work to be welded rests; a plurality of pneumatic valves supported by said tubes; a clamp connected to each of said valves and operated thereby that bear against and hold said work to be welded on said workpiece support; a bracket swingably mounted on one end plate; a roller eccentrically and rotatably mounted on said bracket that receives and supports one end of said workpiece support.

References Cited in the file of this patent
UNITED STATES PATENTS

| 1,130,239 | Auel et al. | Mar. 2, 1915 |
| 1,640,437 | Chapman | Aug. 30, 1927 |
| 1,668,783 | Rupley | May 8, 1928 |